United States Patent [19]
Salem

[11] 3,726,593
[45] Apr. 10, 1973

[54] AIR POLLUTION LIGHT FOR NAKED EYE DETECTION OF INDIVIDUAL SUB-MICRON SIZED PARTICLES

[76] Inventor: Kenneth G. Salem, 226 Belmont Street, Johnstown, Pa. 15904

[22] Filed: Apr. 22, 1970

[21] Appl. No.: 30,849

[52] U.S. Cl. .............................................. 356/103
[51] Int. Cl. ............................................... G01n 21/00
[58] Field of Search ........................................
356/103–104

[56] References Cited

UNITED STATES PATENTS 3,231,748    1/1966    Haessler .......................... 356/103

Primary Examiner—Ronald L. Wibert
Assistant Examiner—Conrad Clark

[57] ABSTRACT

An apparatus is provided for directly observing with the un-aided eye, particles one micron and smaller in diameter, in which a source of light is adapted with a converging lens which collects the light and causes the incident beam to come to a point focus, and when appropriately viewed from a common angle to the light source, light source itself being obscured from sight, light in the area of convergence becomes discernible and scattering of such light by individual particles is then observable when such size particles are present.

3 Claims, 3 Drawing Figures

PATENTED APR 10 1973    3,726,593

AIR POLLUTION LIGHT FOR NAKED EYE DETECTION OF INDIVIDUAL SUB-MICRON SIZED PARTICLES

This invention relates to apparatus and methods for observing colloid size particles directly with the unaided eye and particularly to an apparatus and method based upon the principle of light scattering.

At present the apparatus most commonly used to observe motions of colloid particles such as, for example, tobacco smoke once it is dispersed, is the "Slit-Ultra-Microscope." The characteristic feature of the ultra-microscope is the strong beam of focused light with which the specimen solution is illuminated. The light is projected through a slit from the side at right angles to the barrel of the instrument. By looking through the eyepiece, the colloidal sized smoke particles appear as tiny specks of scattered light which dash together and fly away from each other in a somewhat jitterbug like dance. In this manner the presence of objects less than one micron in diameter is revealed. It is not the particles themselves that are seen, but the impinging light which they reflect.

Today with all the emphasis being placed upon clean air and air pollution controls, there arises a need for inexpensive and instantaneous methods of sampling and analyzing the air we breathe. Of course very exacting methods of measuring and counting these small particles are still necessary, and the methods and apparatus for doing this require portability in order that air samples can be tested in the most remote areas such as for example the inside of a deep coal mine. The most common manner in which these particulates are measured and counted today is with the use of expensive electronic equipment in which photo-electric sensing devices are employed to measure and count the particles of the medium. The device works on the same principle as the slit-ultra-microscope except that it consists of electronic methods of sizing and counting. In this method and results given are most accurate but the particles are not observable to the eye where some sort of instant analysis can be made while experiments for the control of air pollution are actually taking place.

I have invented an apparatus and method for observing directly with the unaided eye, these same size particles, particles which heretofore have been thought to be too small for the eye to observe directly.

Preferably this particular apparatus comprises a relatively strong light source having attached thereto a converging lens and a shield attached at a right angle to the lens in order to block out the light source itself from the eye of the observer when properly positioned. Preferably the light source is a strong beam of light such as a six cell flashlight having D size batteries, or any source of equivalent light. In this particular case a three-inch converging (convex) lens is attached to the head of the flashlight which itself is three inches in diameter, thereby causing the incident parallel beam of light to come to a point focus. A half round shield, utilized to give better results, is attached to the head of the flashlight and converges upwards the approximate distance of the focal length of the converging beam of light.

In the foregoing general description of my invention I have set out certain objects, purposes and advantages of my invention. Other objects, purposes and advantages of this invention will be apparent from a consideration of the following description and accompanying drawings in which.

Figure 1:
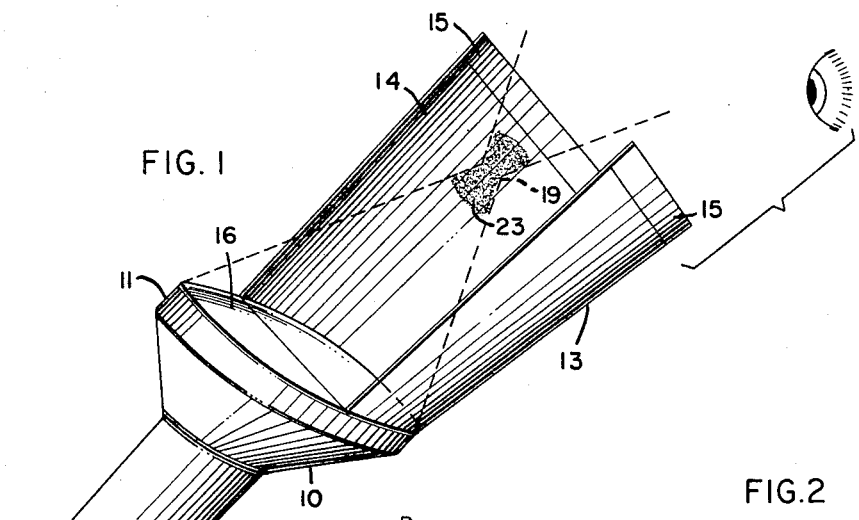
FIG. 1 is an isometric view of an apparatus according to my invention.
Figure 2:
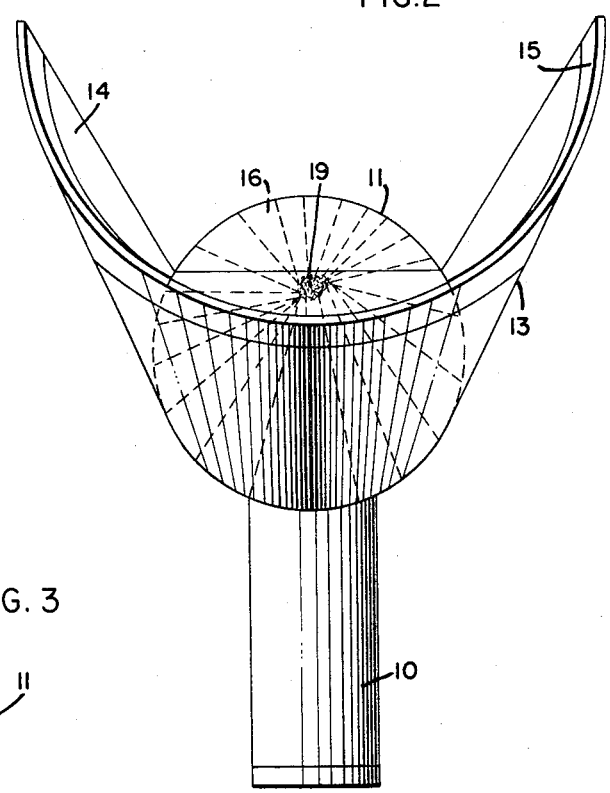
FIG. 2 is a top view of the apparatus of FIG. 1 and represents an ideal position to the eye for a valid observation.
Figure 3:
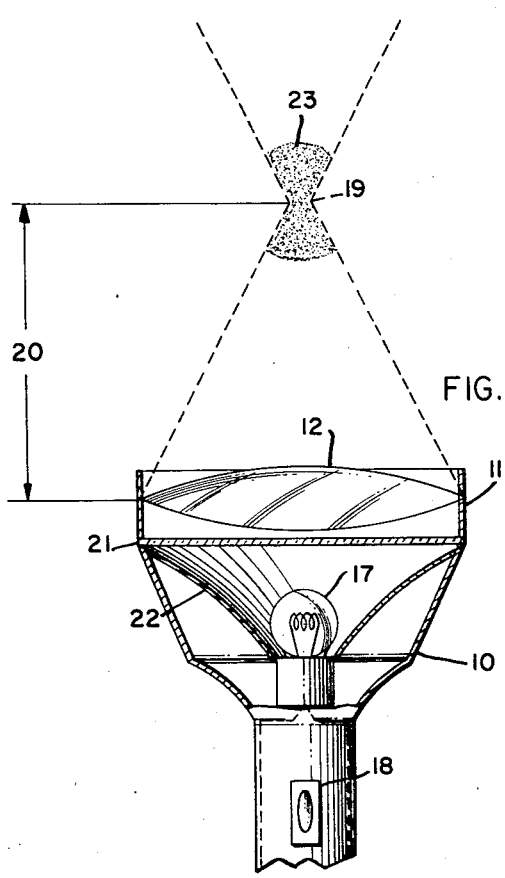
FIG. 3 is a side elevation of the apparatus of FIG. 1.

Referring to the drawing I have illustrated a light source such as a six-cell D size flashlight 10. Attached to the head of the flashlight is a metal frame 11 containing a convex lens 12 within its' bounds. Fixed to the metal frame 11 and protruding upwards is a half round plastic shield 13 covered on the inside with aluminum foil 14 and wrapped around both sides of the top with a strap 15 of black tape. A patch 16 of black tape is also stretched across the top of a third of the metal frame 11 directly adjacent to base of shield 13.

The operation of the device is as follows. Electrical current is introduced to light bulb 17 by means of a switch 18. Light from bulb impinges on convex lens 12 and as a result of lens being convex the incident beam of light converges to a focal point 19, focal length 20 in this particular case being approximately eight inches as a result of particular lens being used. Ordinary flashlight lens 21 is retained only as a matter of accommodating reflector 22. Flashlight 10 is then held preferably in front of observer in a vertical position with top edge of shield 13 being approximately eight inches below observer's eyes. In this position the focal point 19 of the beam is very readily discernible, but only though as long as there are particulates 23 in the medium to scatter the light, otherwise, without particles present, there would be no beam of light visible to the eye. To add more clarity to the observation the shield 13 is covered on the inside with aluminum foil 14 in order to concentrate additional light upon the subject particles 23. Also, the shield is covered with black tape, on both sides, along the top edge in order that better contrast and resolving power is afforded the eye of the observer. Additionally, a patch of black tape is stretched across the top of a third of the metal frame 11 directly adjacent to the base of shield 13 so as to avoid having the eye of observer looking directly into source of light. In this manner the total area of the convex lens 12 is hidden from observer's eyes, leaving substantially that part of space observable which shows well the converging light beam due to scattering when particulates 23 are present. Best results are obtained in a darkened room or at least with a dark background. Concentrating then in the area of the focal point 19 one can then observe the individual particles' motions due to their scattering of light. The concentration of light at this focal point is related to the size and number of particles in the medium being analyzed. The color of the light of each individual particle determines its' size; the smallest particles having a blue hue, and larger ones being gray then white, etc.

As the clarity and resolution in the above described method of observation is excellent, the method can well be utilized in making instantaneous qualitative analysis of air samples anywhere at any time. This method would not require the air to be collected into a container or a filter as is so often the case with present methods, and analyzed later, often times resulting in a somewhat distorted picture of the real facts.

Universally recognized charts which give the diameters of different types of particulates show tobacco smoke particles to be in the range of $1\mu$ down to $0.01\mu$. In contrast to this, coal dust particles are shown to be in the range of $100\mu$ down to $1\mu$. It is with the colloid size tobacco smoke particulates in which all of my experiments and observations were made. These particles are very readily and easily discernible with the apparatus, and under the conditions as set forth and described herein. These light-scattering particles are observed en-masse, yet individually in their undisturbed and three-dimensional state. The apparatus and method is ideal for instantaneous analysis while experiments for controlling air pollution are actually taking place. In this manner it allows one to observe instantly and directly the results of experimental processes to combat pollution. Also, the method and apparatus is ideal for the study of the "Kinetic Molecular Theory of Matter." As for measuring and counting the dispersed particles in the dispersing medium with this particular apparatus, it is evident that this can readily be accomplished by means of color charts and refined techniques of observation.

While I have illustrated and described a preferred practice of my invention, it will be understood that this invention may be otherwise embodied within the scope of the following claims.

I claim:
1. Apparatus for viewing individual particles of submicron size comprising
   a source of high intensity light,
   lens means for focusing light from said source into a small region spaced from said source in the direction of said lens from said source
   shielding means adjacent said source and said lens and only partially peripherally surrounding said lens and flaring outwardly therefrom in the direction of said lens from said source to a terminus slightly more distant from said lens than said small region, and
   means for orienting said apparatus such that direct rays from said source are obstructed from a viewing position.
2. Apparatus as in claim 1, where said source of high intensity light is a flashlight.
3. A method for viewing individual particles of submicron size with the unaided eye comprising:
   providing a source of high intensity light
   focusing said light into a small region
   shielding said unaided eye from any direct rays from said source of light while permitting a view of said small region, and
   viewing the light scattered from the individual particles of submicron size within said small region.

* * * * *